United States Patent
Lorenz et al.

(10) Patent No.: US 12,504,045 B2
(45) Date of Patent: Dec. 23, 2025

(54) WHEEL DECOUPLING DEVICE FOR A MOTOR VEHICLE IN A BISTABLE EMBODIMENT

(71) Applicant: Schaeffler Technologies AG & Co. KG, Herzogenaurach (DE)

(72) Inventors: Elmar Lorenz, Rheinmünster Söllingen (DE); Stefan Reichert, Malsch (DE); Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/722,769

(22) PCT Filed: Dec. 6, 2022

(86) PCT No.: PCT/DE2022/100914
§ 371 (c)(1),
(2) Date: Jun. 21, 2024

(87) PCT Pub. No.: WO2023/138717
PCT Pub. Date: Jul. 27, 2023

(65) Prior Publication Data
US 2025/0067308 A1    Feb. 27, 2025

(30) Foreign Application Priority Data
Jan. 18, 2022 (DE) ..................... 10 2022 101 050.3

(51) Int. Cl.
*F16D 23/12* (2006.01)
*F16D 11/04* (2006.01)
*F16D 11/00* (2006.01)

(52) U.S. Cl.
CPC .............. *F16D 23/12* (2013.01); *F16D 11/04* (2013.01); *F16D 2011/002* (2013.01); *F16D 2023/123* (2013.01)

(58) Field of Classification Search
CPC ..... F16D 11/04; F16D 23/12; F16D 2023/123
See application file for complete search history.

(56) References Cited

U.S. PATENT DOCUMENTS 10,473,168 B2 * 11/2019 Nahrwold ............... F16H 63/30
2016/0319890 A1 * 11/2016 Jameson ................. F16D 23/12
(Continued)

FOREIGN PATENT DOCUMENTS

DE            3119447 A1    5/1982
DE    102021126151 A1    4/2023
(Continued)

*Primary Examiner* — Timothy Hannon

(57) ABSTRACT

A wheel decoupling device for a motor vehicle includes a drive element, an output element, a sliding clutch arranged to connect the drive element to the output element for cojoint rotation, and an actuation unit arranged to adjust the sliding clutch. The actuation unit includes a gearwheel, a sliding ring supported on the sliding clutch in an axially fixed manner, a ramp system and a position-securing unit. The ramp unit is arranged to shift the sliding ring from a first position to a second position when the gearwheel is rotated and the position-securing unit is for axially securing the sliding ring in the first position and in the second position. In the first position, the drive element and the output element are rotationally decoupled, and, in the second position, the drive element and the output element are rotationally coupled in a form fitting manner.

18 Claims, 3 Drawing Sheets

(56) References Cited

U.S. PATENT DOCUMENTS

2018/0345785 A1    12/2018  Beesley et al.
2020/0094675 A1*  3/2020  Johnston .............. B60K 17/356
2021/0148415 A1    5/2021  Bolle et al.
2022/0389997 A1*  12/2022  Lee ........................ F16H 48/24

FOREIGN PATENT DOCUMENTS

DE      102022101050 A1    7/2023
WO        2017075180 A1    5/2017

* cited by examiner

WHEEL DECOUPLING DEVICE FOR A MOTOR VEHICLE IN A BISTABLE EMBODIMENT

CROSS-REFERENCE TO RELATED APPLICATIONS

This application is the United States National Phase of PCT Appln. No. PCT/DE2022/100914 filed Dec. 6, 2022, which claims priority to German Application No. DE102022101050.3 filed Jan. 18, 2022, the entire disclosures of which are incorporated by reference herein.

TECHNICAL FIELD

The present disclosure relates to a wheel decoupling device for a motor vehicle, i.e., a device for selectively decoupling/coupling a wheel/wheel hub of a motor vehicle from/to a drive shaft. The disclosure also relates to a drive unit having said wheel decoupling device.

SUMMARY

A wheel decoupling device for a motor vehicle includes a drive element, an output element, a movably arranged sliding clutch that can be connected to the drive element and the output element for conjoint rotation, and an actuation unit acting on the sliding clutch in an adjusting manner. The actuation unit also has a ramp system. The ramp system is designed in such a way that, with a rotation of an adjusting gearwheel, a sliding ring that is supported on the sliding clutch in an axially fixed manner is shifted axially between a first position in which the drive element and the output element are rotationally decoupled from one another, and a second position in which the sliding clutch rotationally connects the drive element and the output element to one another in a form-fitting manner. Furthermore, a position-securing unit is provided which axially secures/supports the sliding ring both in the first position and in the second position.

This provides a wheel decoupling device that acts in a form-fitting manner, requires little installation space and can be integrated directly in a wheel hub and/or in the vicinity of a wheel hub of a motor vehicle in a space-saving manner. This allows one wheel of the motor vehicle to be decoupled during operation, which contributes to an increase in efficiency, in particular when the motor vehicle is coasting. In addition, the clutch is designed to act in a bistable manner, i.e., it functions reliably both in its disengaged position and in its engaged position if an actuation fails.

The position-securing unit may have a preload spring unit. The position-securing unit is therefore designed to be robust and reliable with respect to its function.

If the preload spring unit is applied in such a way that the sliding ring is preloaded into the first position, the position of the sliding ring is secured with respect to the first position by simple means.

In this context, it is expedient if the preload spring unit has at least one spring element which is operatively applied/clamped between a housing and the sliding clutch. The preload spring unit may have multiple spring elements contacting one another in series, e.g., multiple wave springs. This also enables a compact design.

The ramp system may be designed to be self-releasing. The ramp system may be designed to be self-releasing in such a way that when a torque driving the adjusting gearwheel during operation ceases (/when the torque falls below a certain torque driving the adjusting gearwheel during operation), the sliding ring is automatically pushed back (by the preload spring unit) into the first position outside of/at a distance from the second position. This further increases the functional reliability.

In order to ensure that the ramp system operates with little wear, the adjusting gearwheel and the sliding ring may be supported against one another in the axial direction via a rolling element (e.g., via multiple rolling elements arranged distributed in the circumferential direction), for example in the form of balls. The rolling element may bear directly against a ramp contour (e.g., rising continuously in the circumferential direction) of the adjusting gearwheel and/or a ramp contour (e.g., rising continuously in the circumferential direction) of the sliding ring and a holding section is provided in the circumferential direction adjacent to the at least one ramp contour, by means of which the rolling element is secured/blocked against further rolling in a form-fitting manner and/or in a friction-locking manner in the second position of the sliding ring.

If the holding section is integrated directly into a raceway (of the sliding ring or adjusting gearwheel) that receives the rolling element, the design is further simplified.

In this context, it has also proven expedient for the holding section to have a reduced slope or no slope in the circumferential direction compared to the at least one ramp contour (e.g., designed as a 0° flank).

Furthermore, the holding section may have a recess/trough in the raceway receiving the rolling element, into which recess the rolling element can engage in a form-fitting manner. This ensures that the rolling element is locked with little wear.

If the sliding ring is supported on the sliding clutch by means of a spring unit, the ramp system is again subjected to a certain axial preload force, which further reduces wear.

If the adjusting gearwheel is supported in an axially fixed manner on a housing, e.g., by means of an axial bearing, the actuation unit is stably received in the housing.

The sliding clutch may have a sleeve region with a constant-diameter toothing, e.g., designed as an inner toothing, which in the second position is connected in a form-fitting manner in the direction of rotation both to a complementary toothing of the drive element and to a complementary toothing of the output element. This keeps the design of the sliding clutch as simple as possible.

If the adjusting gearwheel is driven by an electric actuator, the wheel decoupling device is actuated efficiently during operation of the motor vehicle.

The present disclosure further relates to a drive unit for a motor vehicle, having a drive shaft (e.g., formed as an output of a tripod), a wheel hub and a wheel decoupling device according to the disclosure which is received in a steering knuckle, according to at least one of the embodiments described above. The drive element of the wheel decoupling device is connected to the drive shaft or is formed directly by the drive shaft and the output element of the wheel decoupling device is connected to the wheel hub or is formed directly by the wheel hub.

In other words, a wheel separation unit (wheel decoupling device) is thus formed according to the disclosure, by means of which the wheel is decoupled from or coupled to the rest of the drive train depending on the corresponding drive mode of the motor vehicle. Bistability is realized by means of a ramp system and a return spring (preload spring unit). If the clutch (wheel decoupling device) is disengaged, i.e., the sliding clutch is (only) in engagement with the tripod (drive shaft), the sliding clutch is held in this stable state by the force of the wave spring assembly (preload spring unit). When the ramp mechanism (ramp system) is actuated by the spur gear (adjusting gearwheel), the sliding clutch is shifted and brought into engagement with the output-side hub toothing (second complementary toothing). If a failure occurs while the clutch is engaging, the sliding clutch is repositioned to the disengaged state (first position) by the wave spring assembly. The spur gear is not designed to be self-locking, which means that the return process is not blocked.

Two different variants are available to keep the clutch engaged in the engaged state in the event of a failure. In a first variant, the slope of the ramp changes to 0° (end position without slope) at the end of the ball raceways (ramp contours). This corresponds to a flat plateau on which the ball (rolling element) remains in the engaged state. Due to the arrangement of the wheel decoupling device directly on the wheel and the associated undamped mechanical loads, a second variant provides an end position with a pit (recess) for the ball. As soon as the balls are engaged in the pits at the end of the raceways (/ramp contours), the clutch remains engaged even in the event of a failure (second position). In contrast to the first variant, the balls are held in position in a form-fitting and not friction-locking manner here. By reversing the speed and motor torque of the electric motor (actuator), the ramp/adjusting gearwheel can be turned back and the wheel decoupling device be disengaged.

BRIEF DESCRIPTION OF THE DRAWINGS

The present disclosure will now be explained in more detail below with reference to figures.

In the figures.

DETAILED DESCRIPTION

The figures are merely schematic in nature and serve solely for understanding the disclosure. Identical elements are provided with the same reference signs. The different features of the various exemplary embodiments can in principle also be freely combined with one another.

Figure 1:
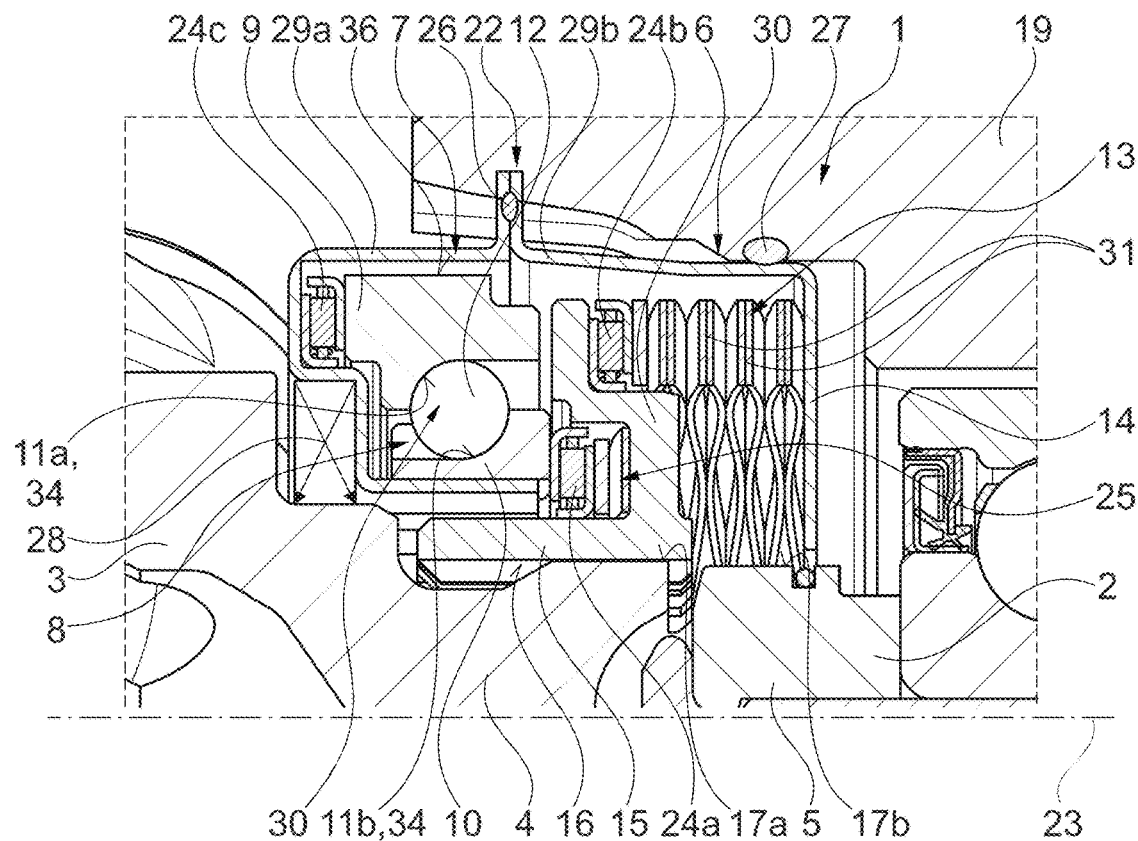
FIG. 1 shows a longitudinal sectional view of a wheel decoupling device according to an exemplary embodiment, wherein the wheel decoupling device is already applied in a drive unit of a motor vehicle having a steering knuckle and is arranged in a decoupled/disengaged state.

FIG. 1 shows a wheel decoupling device 1 in detail. The wheel decoupling device 1 is a decoupling device in the sense of a clutch/disconnect clutch for separating a wheel/a wheel hub 2, which is connected to the wheel of the motor vehicle equipped with a tire for conjoint rotation, from the adjacent rotating components of the drive train, in this case a drive shaft 3. The wheel decoupling device 1 is therefore applied directly between the drive shaft 3 and the wheel hub 2 of a motor vehicle. The drive shaft 3 is further designed as a component (output/a component facing the wheel) of a cardan shaft, namely a tripod.

It can also be seen that a housing 14 of the wheel decoupling device 1 is received/integrated directly in a steering knuckle 19 of a wheel suspension.

The directional indications "axial"/"radial" and "circumferential direction" used herein denote different directions, which are to be understood in relation to a central axis of rotation 23. The axis of rotation 23 forms an axis of rotation of the wheel hub 2 and the drive shaft 3. "Axially"/"axial direction" is to be understood as a direction along/parallel to the axis of rotation 23; "radially"/"radial direction" is to be understood as a direction perpendicular to the axis of rotation 23; and "circumferential direction" is to be understood as a direction along a circular line that runs concentrically around the axis of rotation 23.

Figure 2:
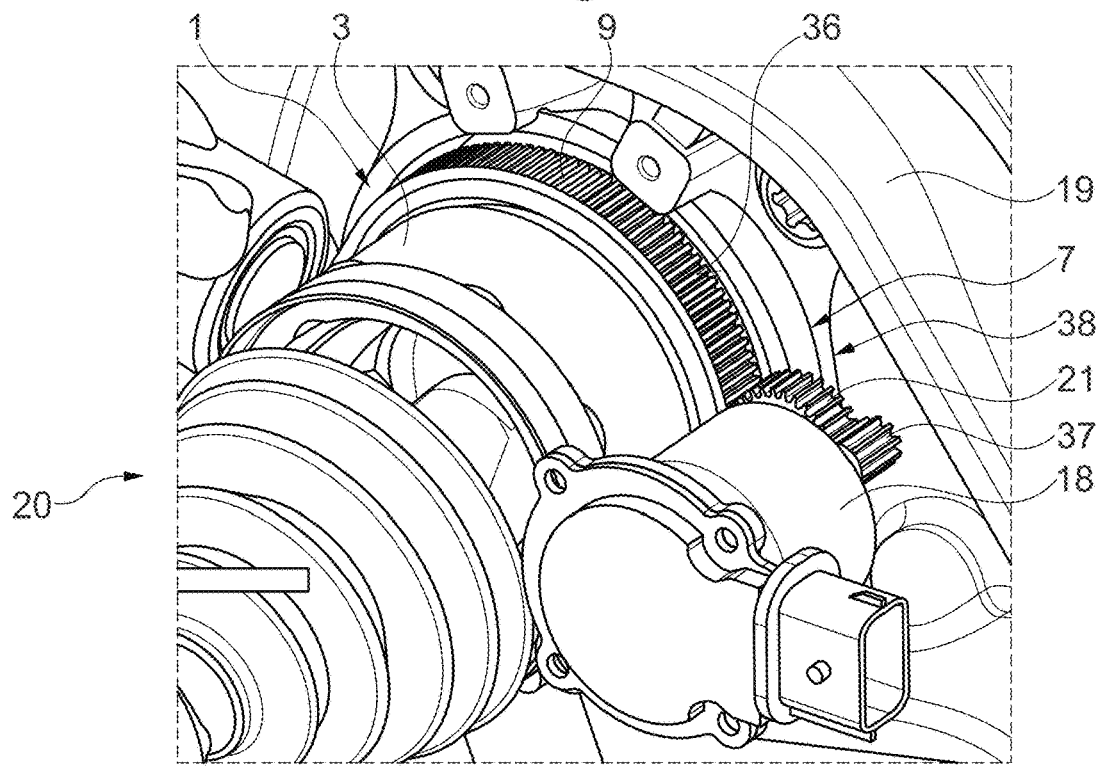
FIG. 2 shows a perspective view of a drive unit having a wheel decoupling device according to FIG. 1, wherein an actuator actuating the wheel decoupling device is also shown.
Figure 3:
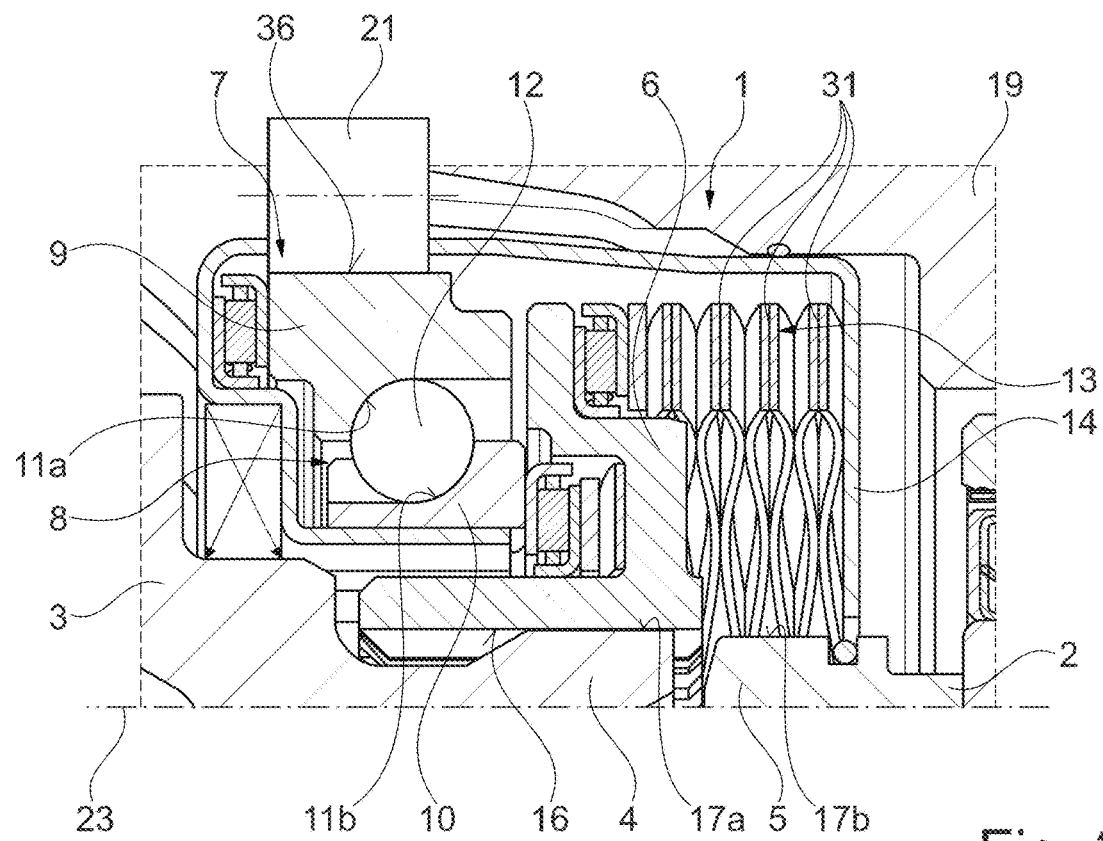
FIG. 3 shows a longitudinal sectional view of the wheel decoupling device according to FIG. 1 in the region of a tooth contact between an adjusting gearwheel and a further gearwheel in operative connection with the actuator, wherein the wheel decoupling device is again in the decoupled state.

The wheel decoupling device 1 is shown in FIGS. 1 and 2 in a decoupled state/disengaged state and in FIG. 3 in a coupled state/engaged state. The wheel decoupling device 1 is designed as a clutch that acts in a form-fitting manner/form-fit clutch.

The wheel decoupling device 1 has a sliding clutch 6, which can be shifted relative to an end region of the drive shaft 3, referred to as the drive element 4, and an end region of the wheel hub 2, referred to as the output element 5. The sliding clutch 6 has a toothing 16 designed as an inner toothing, which interacts accordingly with complementary toothings 17a, 17b of the drive element 4 and the output element 5, respectively, and can be connected to these for conjoint rotation in a form-fitting manner.

According to FIG. 1, the sliding clutch 6 is shifted into a first position corresponding to the decoupled state, in which its toothing 16 is only in meshing engagement with the first complementary toothing 17a of the drive element 4, but is arranged out of meshing engagement with the second complementary toothing 17b of the output element 5. This first position is supported by a preload spring unit 13 described in more detail below. In a second position corresponding to the coupled state, the sliding clutch 6 is shifted axially relative to the first position to such an extent that the toothing 16 contacts both the first complementary toothing 17a and the second complementary toothing 17b for conjoint rotation in a form-fitting manner. In the coupled state/in the second position, the sliding clutch 6 thus connects the drive element 4 and the output element 5 for conjoint rotation.

It should also be noted that the toothing 16 of the sliding clutch 6 has a constant (inner) diameter. Therefore, the complementary toothings 17a, 17b preferably also have the same (outer) diameter.

An actuation unit 7 is provided for actuating/shifting the sliding clutch 6 between its first position and second position. The actuation unit 7 has a ramp system 8. The ramp system 8 also has an adjusting gearwheel 9 and a sliding ring 10. In addition, the ramp system 8 has multiple rolling elements 12 arranged distributed in the circumferential direction, which are formed as balls here. The adjusting gearwheel 9 is axially placed against/supported on the sliding ring 10 via the rolling elements 12.

With respect to FIGS. 1 to 3, it should be noted that both the adjusting gearwheel 9 and the sliding ring 10 form ramp contours 11a, 11b, respectively, which directly form the raceway 34 for the rolling elements 12. Each ramp contour 11a, 11b axially rises continuously along its extent as seen in the circumferential direction. The ramp contours 11a, 11b rise in a circumferential direction, in particular axially, in opposite directions to one another. The ramp contours 11a, 11b are therefore designed as spindle-shaped/helical tracks.

The ramp contours 11a, 11b are matched to one another in such a way that when the adjusting gearwheel 9 is rotated in a first direction of rotation relative to the sliding ring 10, the rolling elements 12 roll along the ramp contours 11a, 11b, thereby pushing the sliding ring 10 away from the adjusting gearwheel 9. When the adjusting gearwheel 9 is rotated in the opposite direction in a second direction of rotation, the sliding ring 10 is, in turn, pushed back in the direction of the adjusting gearwheel 9. This results in the corresponding decoupled state or coupled state of the wheel coupling device 1 due to the rotation of the adjusting gearwheel 9. The sliding ring 10 is further received/guided on the housing 14 in a rotationally fixed manner.

It can also be seen that the sliding ring 10 is supported on the sliding clutch 6 on its side axially facing away from the adjusting gearwheel 9/the rolling element 12. For this purpose, the sliding ring 10 is supported on the end face via a (first) axial bearing 24a and a spring unit 25 (here having at least one wave spring) on the sliding clutch 6 radially outside of a sleeve region 15 having the toothing 16. The sliding ring 10 is therefore shifted between the first position and the second position, as is the sliding clutch 6.

Axially opposite the sliding ring 10, the sliding clutch 6 is further spring-preloaded relative to the housing 14. The preload spring unit 13 is provided for this purpose, which serves to press the sliding clutch 6 with an axial preload in the direction of the adjusting gearwheel 9.

This preload spring unit 13 forms a position-securing unit 30, which preloads the sliding ring 10 and consequently also the sliding clutch 6 into the first position, i.e., axially secures/supports it in the first position. In this regard, the ramp system 8 is designed to be self-releasing, so that when a torque driving the adjusting gearwheel 9 during operation ceases, the sliding ring 10 is automatically pushed back into the first position outside of the second position, i.e., in any intermediate position axially between the first position and the second position.

The preload spring unit 13 has at least one spring element 31, here even multiple spring elements 31 arranged axially in series with one another in the form of wave springs, which are operatively applied axially between the housing 14 and the sliding clutch 6.

It should also be noted in this context that both the preload spring unit 13 and the spring unit 25 can also have other mechanical springs, such as spiral springs, disc springs or spring assemblies.

Figure 4:
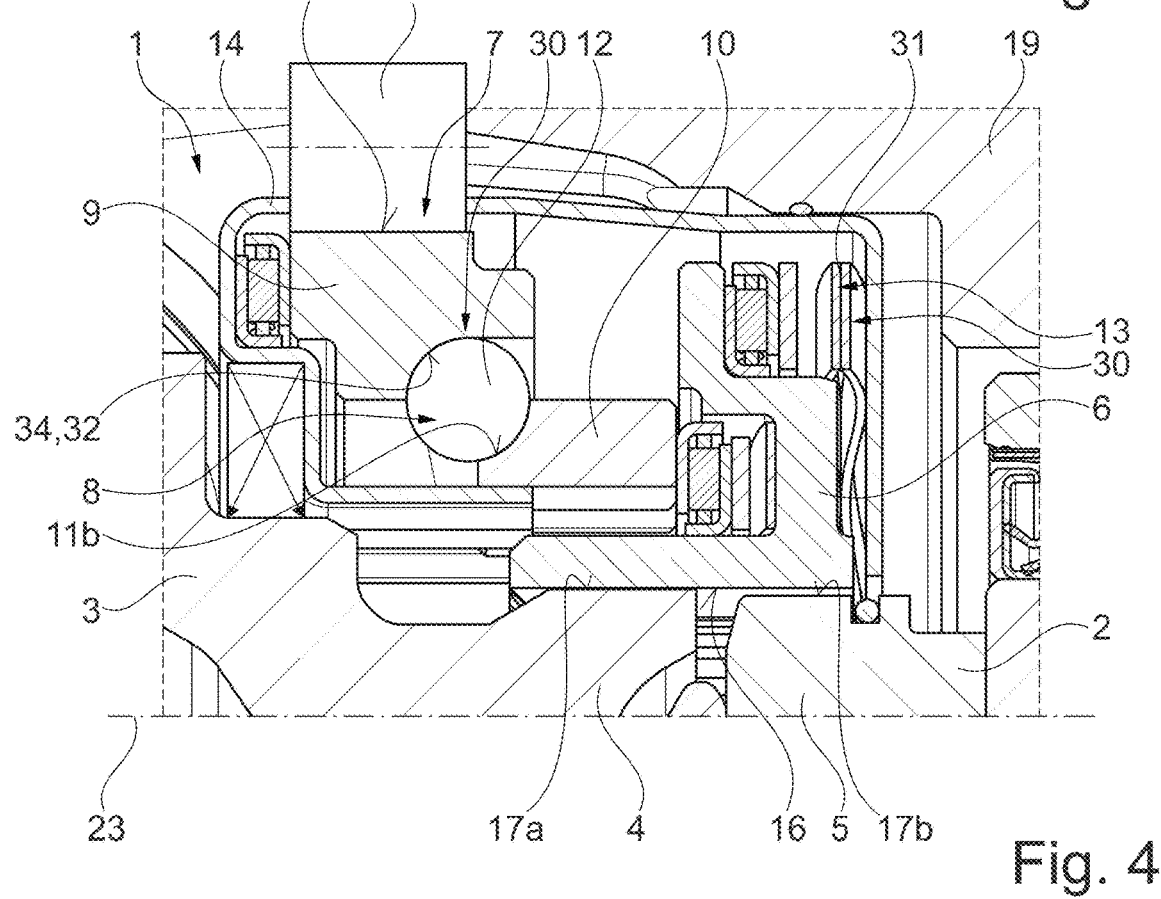
FIG. 4 shows a further longitudinal sectional view of the wheel decoupling device according to FIG. 1, wherein the wheel decoupling device is now in a coupled state/engaged state.

The preload spring unit 13 is supported on the sliding clutch 6 by means of a (second) axial bearing 24b. The preload spring unit 13 is thus essentially received in a manner fixed to the housing and the sliding clutch 6 is mounted/supported such that it can rotate relative to the preload spring unit 13. For the sake of clarity, the preload spring unit 13 is shown in FIG. 4 with a reduced number of wave springs compared to FIGS. 1 and 2.

In this embodiment, the position-securing unit 30 is actually designed to be bistable and secures the sliding ring 10 and consequently also the sliding clutch 6 not only in its first position, but also in the second position. When the sliding ring 10 reaches the second position, it is, in turn, automatically locked in this second position so that the sliding ring 10 remains in the second position when the torque driving the adjusting gearwheel 9 during operation ceases.

Figure 5:
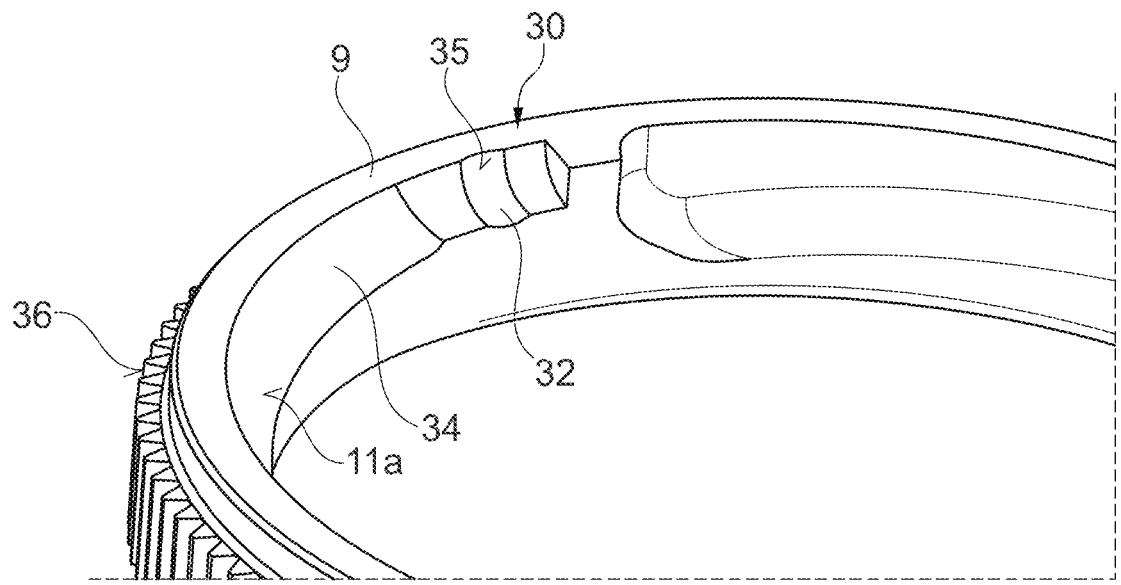
FIG. 5 shows a perspective view of the adjusting gearwheel applied in FIGS. 1 to 4, wherein a recess securing a rolling element in an engaged state of the wheel decoupling device can be seen in a raceway of the adjusting gearwheel.

Generally speaking, a (first) holding section 32, which can be seen in more detail in FIG. 5, is provided for this purpose, by means of which one of the rolling elements 12 is secured in a form-fitting manner/prevented from rolling further along the raceway 34 in the second position of the sliding ring 10. The (first) holding section 32 is integrated directly into the raceway 34 receiving the rolling element 12. In this embodiment, the (first) holding section 32 is formed in the adjusting gearwheel 9, but in further embodiments it can alternatively be formed in the sliding ring 10. According to FIG. 5, the (first) holding section 32 has a recess 35, which is formed in the raceway 34. The recess 35 is dimensioned such that the rolling element 12 engages in a form-fitting manner in the second position (form-fit acting in the circumferential direction/direction of rotation).

As the sliding ring 10 is supported in the axial direction on the adjusting gearwheel 9 via the rolling element 12, the rolling element 12 is in permanent and direct contact with both the first ramp contour 11a of the adjusting gearwheel 9 and the second ramp contour 11b of the sliding ring 10. The (first) holding section 32 with the recess 35 is directly adjacent to the first ramp contour 11a so that the rolling element 12 engages in the recess 35 in the second position and is therefore blocked relative to the adjusting gearwheel 9 (with a certain holding force).

Figure 6:
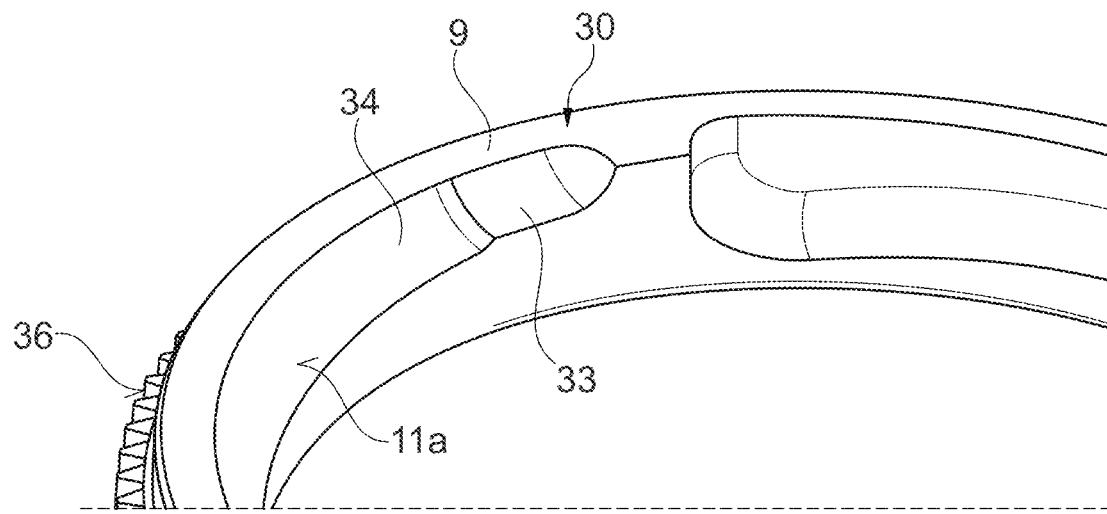
FIG. 6 shows a perspective view of an alternative design of the adjusting gearwheel compared to the variant shown in FIG. 5, wherein the raceway of the adjusting gearwheel now only has a section that does not have a slope (in the circumferential direction).

According to FIG. 6, the (first) holding section 32 can alternatively be replaced by a (second) holding section 33 which, in the second position of the sliding ring 10, essentially blocks the rolling element 12 from rolling further by means of a friction-locking support. In this embodiment, the second holding section 33 is designed with a reduced slope or no slope at all in the circumferential direction/with the formation of a 0° flank compared to the first ramp contour 11a. This also secures the second position of the sliding ring 10/sliding clutch 6.

In connection with FIG. 2, in which an entire drive unit 20 is indicated, it should be noted that the adjusting gearwheel 9 may be adjustable via a gearwheel 21 which can be driven/is driven by an electric actuator 18. The actuator 18 is designed as a purely electric actuator 18 (rotary motor). The gearwheel 21 may engage directly in a toothing, here designed as an outer toothing 36, of the adjusting gearwheel 9. The gearwheel 21 is designed here as an intermediate gearwheel and is in meshing engagement with a pinion 37 located on a rotor shaft of the actuator 18. Consequently, the actuator 18 drives the adjusting gearwheel 9 via a transmission 38 (here in the form of a spur gear), which includes the gearwheel 21, the pinion 37 and the outer toothing 36.

With regard to the housing 14, it should also be noted with reference to FIG. 1 that this includes two parts 29a, 29b, for example, which are connected to one another in a connecting region 22. Here again, a seal 26, for example in the form of an O-ring, may be present in the connecting region 22/contact region of both parts of the housing 14. A corresponding static seal 27 can, in turn, also be provided between the steering knuckle 19 and the housing 14. Furthermore, a radial shaft seal 28 may be provided radially between the housing 14 and the drive element 4.

Furthermore, a further (third) axial bearing 24c is provided on a side of the adjusting gearwheel 9 axially facing away from the sliding clutch 6. The adjusting gearwheel 9 is supported on the housing 14 by means of this (third) axial bearing 24c.

In other words, in the wheel decoupling device according to the disclosure, a sliding clutch 6 is shifted by means of a ramp geometry (ramp contours 11a, 11b) in order to switch/adjust the wheel decoupling device. A return spring (preload spring unit 13) is provided for quickly bridging the force-fit of the wheel decoupling device 1 close to the tire. A further return spring (spring unit 25) also serves to center the ramp unit (ramp system 8). The return spring (preload spring unit 13) for the decoupling/separating function can also be a disc spring, a spring assembly or a spiral spring.

The subject matter of the application therefore concerns a wheel decoupling device 1 ("disconnect unit (DCU)"), which is integrated into the drive train directly on the wheel between the drive shaft 3 and the hub (wheel hub 2). Depending on the corresponding drive mode, the wheel decoupling device 1 decouples or couples the wheel from/to the rest of the drive train. By shifting the sliding clutch 6, the drive-side toothing (first complementary toothing 17a) of the tripod is connected in a form-fitting manner to the output-side toothing (second complementary toothing 17b) of the hub. The axial shift of the sliding clutch 6 is implemented by a ramp system 8, which converts a rotational movement into an axial movement. The ramp system 8 includes an adjusting gearwheel 9, balls (rolling elements 12) and an axially movable ramp (sliding ring 10). In this regard, the raceways 34 (having ramp contours 11a, 11b) of the balls can be designed in accordance with the required travel distance.

The ramp system 8 is actuated by an electric motor (actuator 18) with a spur gear (transmission 38), which engages in the adjusting gearwheel 9. The axially movable ramp (sliding ring 10) is fixed in the housing 14 of the wheel decoupling device 1 by means of a toothing in a rotationally fixed manner. When the adjusting gearwheel 9 is actuated, the balls are shifted axially due to the helical raceways 34. The mounting of the ramp (sliding ring 10) for conjoint rotation leads to its axial shift. The adjusting gearwheel 9 is centered due to the contact angle, which is why no separate radial mounting is required. The relative movement of the adjusting gearwheel 9 with respect to the housing 14 is compensated by an axial needle bearing (third axial bearing 24c).

In the disengaged state, the sliding clutch 6 only engages in the drive-side toothing (first complementary toothing 17a) of the tripod. If the wheel decoupling device 1 is engaged, the sliding clutch 6 is also shifted in line with the axial movement of the ramp. The relative movement between the ramp and the sliding clutch 6 is compensated by a further axial bearing/axial needle bearing (first axial bearing 24a). A wave spring (spring unit 25) is integrated between the axial bearing (first axial bearing 24a) and the sliding clutch 6 in order to ensure a defined flexibility in the event of a tooth-on-tooth contact.

The ramp system 8 requires an axial preload, which is realized by means of a wave spring assembly (preload spring unit 13). The wave spring (preload spring unit 13) is positioned in the housing 14 and connected to the sliding clutch 6 via a further axial bearing/axial needle bearing (second axial bearing 24b). If the sliding clutch 6 is disengaged by the actuator 18, the wave spring assembly (preload spring unit 13) relaxes and pushes the sliding clutch 6 back into the initial state (decoupled state).

A bistability is realized by means of the ramp system 8 and the return spring (preload spring unit 13). If the clutch is disengaged, i.e., the sliding clutch 6 is in engagement with the tripod (drive shaft 3), the sliding clutch 6 is held in this stable state by the force of the wave spring assembly (preload spring unit 13). When the ramp mechanism is actuated by the spur gear, the sliding clutch 6 is shifted as described above and brought into engagement with the output-side hub toothing (second complementary toothing 17b). If a failure occurs while the clutch is engaging, the sliding clutch 6 is repositioned to the disengaged state (decoupled state) by the wave spring assembly. The spur gear is not designed to be self-locking, which means that the return process is not blocked.

Two different variants are available to keep the clutch engaged in the engaged state (coupled state) in the event of a failure. At the end of the ball raceways (i.e., at an end region of the raceways 34 in the circumferential direction), the slope of the ramp (here the first ramp contour 11a) changes to 0° (end position without slope). This corresponds to a flat plateau on which the ball remains in the engaged state. Due to the arrangement of the wheel decoupling device 1 directly on the wheel and the associated undamped mechanical loads, the other variant provides an end position with a pit (recess 35) for the ball. As soon as the balls are engaged in the pits at the end of the raceways 34, the clutch remains engaged even in the event of a failure. In contrast to the first variant, the balls are held in position in a form-fitting and not friction-locking manner here. By reversing the speed and motor torque of the electric motor, the ramp (adjusting gearwheel 9) can be turned back and the wheel decoupling device 1 disengaged.

The wheel decoupling device 1 is completely enclosed and is thus protected against ingress of ambient media and escaping lubricants. The housing 14 is mounted on the wheel axle using multiple receiving fittings, which are not shown for the sake of clarity. The housing 14 is sealed against the tripod with a dynamic seal (radial shaft seal 28). A static O-ring seal (static seal 27) is installed opposite of the steering knuckle 19. Due to the assembly, the housing 14 is divided in the region of the screwing points. The flange connection (connecting region 22) of the housing 14 is also sealed by means of an O-ring (seal 26).

REFERENCE NUMERALS

1 Wheel decoupling device
2 Wheel hub
3 Drive shaft
4 Drive element
5 Output element
6 Sliding clutch
7 Actuation unit
8 Ramp system
9 Adjusting gearwheel
10 Sliding ring
11a Ramp contour of the adjusting gearwheel
11b Ramp contour of the sliding ring
12 Rolling element
13 Preload spring unit
14 Housing
15 Sleeve region
16 Toothing
17a First complementary toothing
17 Second complementary toothing
18 Actuator
19 Steering knuckle 20 Drive unit
21 Gearwheel
22 Connecting region
23 Axis of rotation
24a First axial bearing
24b Second axial bearing
24c Third axial bearing
25 Spring unit
26 Seal
27 Static seal
28 Radial shaft seal
29a First part of the housing
29b Second part of the housing
30 Position-securing unit
31 Spring element
32 First holding section
33 Second holding section
34 Raceway
35 Recess
36 Outer toothing
37 Pinion
38 Transmission

The invention claimed is:

1. A wheel decoupling device for a motor vehicle, having a drive element, an output element, a movably arranged sliding clutch that can be connected to the drive element and the output element for conjoint rotation, and an actuation unit acting on the sliding clutch in an adjusting manner, wherein the actuation unit also has a ramp system and the ramp system is designed in such a way that, with a rotation of an adjusting gearwheel, a sliding ring that is supported on the sliding clutch in an axially fixed manner is shifted axially between a first position in which the drive element and the output element are rotationally decoupled from one another, and a second position in which the sliding clutch rotationally connects the drive element and the output element to one another in a form-fitting manner, wherein a position-securing unit is provided which axially secures the sliding ring both in the first position and in the second position, and wherein the adjusting gearwheel and the sliding ring are supported against one another in the axial direction via a rolling element, wherein the rolling element bears directly against a ramp contour of the adjusting gearwheel or a ramp contour of the sliding ring and a holding section is provided in the circumferential direction adjacent to the ramp contour, by means of which the rolling element is secured in a form-fitting manner or in a friction-locking manner against further rolling in the second position of the sliding ring.

2. The wheel decoupling device according to claim 1, wherein the position-securing unit has a preload spring unit.

3. The wheel decoupling device according to claim 2, wherein the preload spring unit is applied in such a way that the sliding ring is preloaded into the first position.

4. The wheel decoupling device according to claim 2, wherein the preload spring unit has at least one spring element which is operatively applied between a housing and the sliding clutch.

5. The wheel decoupling device according to claim 1, wherein the ramp system is designed to be self-releasing in such a way that when a torque driving the adjusting gearwheel during operation ceases, the sliding ring is automatically pushed back into the first position outside of the second position.

6. The wheel decoupling device according to claim 1, wherein the holding section is integrated directly into a raceway receiving the rolling element.

7. The wheel decoupling device according to claim 6, wherein the holding section has a recess in the raceway receiving the rolling element, into which recess the rolling element can engage in a form-fitting manner.

8. The wheel decoupling device according to claim 1, wherein the holding section has a reduced slope or no slope in the circumferential direction compared to the ramp contour.

9. A drive unit for a motor vehicle, having a drive shaft, a wheel hub and the wheel decoupling device which is received in a steering knuckle, according to claim 1, wherein the drive element of the wheel decoupling device is connected to the drive shaft or is formed directly by the drive shaft and the output element of the wheel decoupling device is connected to the wheel hub or is formed directly by the wheel hub.

10. A wheel decoupling device for a motor vehicle, comprising:
a drive element;
an output element;
a sliding clutch arranged to connect the drive element to the output element for conjoint rotation;
an actuation unit arranged to adjust the sliding clutch, the actuation unit comprising:
a gearwheel;
a sliding ring supported on the sliding clutch in an axially fixed manner;
a ramp system arranged to shift the sliding ring from a first position to a second position when the gearwheel is rotated; and
a position-securing unit for axially securing the sliding ring in the first position and in the second position, wherein:
in the first position, the drive element and the output element are rotationally decoupled; and
in the second position, the drive element and the output element are rotationally coupled in a form fitting manner; and
a rolling element arranged to support the gearwheel against the sliding ring in an axial direction, wherein:
the gearwheel comprises a first ramp contour, the rolling element bearing directly against the first ramp contour;
the sliding ring comprises a second ramp contour, the rolling element bearing directly against the second ramp contour; and
a holding section circumferentially adjacent to the first ramp contour or the second ramp contour is arranged to secure the rolling element in a form fitting manner or a friction locking manner when the sliding ring is shifted to the second position.

11. The wheel decoupling device of claim 10, wherein the position-securing unit comprises a preload spring unit.

12. The wheel decoupling device of claim 11 further comprising a housing, wherein the preload spring unit comprises a spring element operatively applied between the housing and the sliding clutch.

13. The wheel decoupling device of claim 11, wherein the preload spring unit is arranged to preload the sliding ring in the first position.

14. The wheel decoupling device of claim 13, wherein the ramp system is self-releasing and the sliding ring is shifted to the first position when a torque on the gearwheel is removed.

15. The wheel decoupling device of claim 10, wherein:
the gearwheel and the sliding ring form a raceway;
the rolling element is disposed in the raceway; and the holding section is integrated directly into the raceway.

16. The wheel decoupling device of claim 10, wherein:
the first ramp contour and the second ramp contour comprise respective slopes; and
the holding section comprises a slope that is less than the respective slopes.

17. The wheel decoupling device of claim 10, wherein:
the holding section comprises a recess; and
the rolling element is arranged to engage the recess in a form-fitting manner.

18. A drive unit for a motor vehicle, comprising:
a drive shaft;
a wheel hub;
a steering knuckle; and
the wheel decoupling device of claim 10 disposed in the steering knuckle, wherein:
   the drive element is connected to the drive shaft or is formed by the drive shaft; and
   the output element is connected to the wheel hub or is formed by the wheel hub.

\* \* \* \* \*